US008871845B2

(12) United States Patent
Lalgudi et al.

(10) Patent No.: US 8,871,845 B2
(45) Date of Patent: Oct. 28, 2014

(54) COMPOSITION FOR EASY TO CLEAN SURFACES

(75) Inventors: Ramanathan S. Lalgudi, Westerville, OH (US); Barry L. McGraw, Westerville, OH (US); Robert J. Cain, Lewis Center, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 13/643,229

(22) PCT Filed: May 2, 2011

(86) PCT No.: PCT/US2011/034796
§ 371 (c)(1),
(2), (4) Date: Oct. 24, 2012

(87) PCT Pub. No.: WO2011/137440
PCT Pub. Date: Nov. 3, 2011

(65) Prior Publication Data

US 2013/0041083 A1 Feb. 14, 2013

Related U.S. Application Data

(60) Provisional application No. 61/329,886, filed on Apr. 30, 2010.

(51) Int. Cl.

| | |
|---|---|
| ***C08K 5/5415*** | (2006.01) |
| ***C11D 7/16*** | (2006.01) |
| ***C11D 11/00*** | (2006.01) |
| ***C11D 7/20*** | (2006.01) |
| ***C11D 7/22*** | (2006.01) |
| ***C11D 3/39*** | (2006.01) |
| ***C11D 7/06*** | (2006.01) |
| ***C11D 7/36*** | (2006.01) |
| ***C11D 3/00*** | (2006.01) |

(52) U.S. Cl.
CPC .. *C11D 7/22* (2013.01); *C11D 7/16* (2013.01); *C11D 11/0029* (2013.01); *C11D 7/20* (2013.01); *C11D 3/3942* (2013.01); *C11D 7/06* (2013.01); *C11D 7/36* (2013.01); *C11D 3/0057* (2013.01)
USPC .......................................................... 524/262

(58) Field of Classification Search
None
See application file for complete search history.

(56) References Cited

U.S. PATENT DOCUMENTS 3,178,299 A * 4/1965 Wilborn ........................ 106/628
3,432,312 A * 3/1969 Dahowski et al. ........... 106/38.3
(Continued)

FOREIGN PATENT DOCUMENTS

| | | |
|---|---|---|
| EP | 0437988 | 7/1991 |
| WO | 2005023971 | 3/2005 |
| WO | 2008106215 | 9/2008 |

*Primary Examiner* — Robert S Loewe
(74) *Attorney, Agent, or Firm* — Yimei C. Hammond; Kremblas & Foster

(57) ABSTRACT

A composition for an easy to clean surface comprises a reaction product of a. a first compound of a formula AYB, wherein A comprises an alkyl group, Y comprises a metalloid, and B comprises alkali metal;
b. a second compound comprising
 i. a compound (1) selected from a group consisting of a compound of a formula MR or a precursor of the compound of the formula MR, wherein M is selected from a group consisting of alkali metal, alkaline earth metal, transition metal, and a mixture thereof, and R is selected from a group consisting of phosphonic group, phosphinic group, phosphoric group, and a mixture thereof;
 ii. a compound (2) comprising metal oxides, metal hydroxides, or metal peroxides, wherein the metal is selected from alkaline earth metals; and/or
 iii. A mixture thereof; and
c. an optional polymer.

Methods of making and using the above compositions are also included.

23 Claims, 1 Drawing Sheet

(56) References Cited

U.S. PATENT DOCUMENTS

| | | | | | |
|---|---|---|---|---|---|
| 3,460,523 | A | | 8/1969 | Stiles et al. | |
| 3,460,955 | A | | 8/1969 | Airola | |
| 3,580,733 | A | | 5/1971 | Ott | |
| 3,669,699 | A | * | 6/1972 | Doi et al. | 106/629 |
| 3,742,930 | A | | 7/1973 | Ott et al. | |
| 3,793,055 | A | | 2/1974 | Shodai et al. | |
| 3,961,968 | A | * | 6/1976 | Wales | 106/38.35 |
| 4,018,616 | A | * | 4/1977 | Sugahara et al. | 106/629 |
| 4,040,842 | A | | 8/1977 | Maskishima et al. | |
| 4,359,039 | A | | 11/1982 | Uchikawa | |
| 4,615,918 | A | | 10/1986 | Reichert et al. | |
| 4,740,393 | A | | 4/1988 | Cody et al. | |
| 4,741,862 | A | | 5/1988 | Kosal | |
| 4,769,076 | A | * | 9/1988 | Watanabe et al. | 106/38.35 |
| 4,927,673 | A | | 5/1990 | Buntrock et al. | |
| 5,223,030 | A | * | 6/1993 | Valette et al. | 106/38.2 |
| 5,296,032 | A | | 3/1994 | Jenkins et al. | |
| 5,356,469 | A | | 10/1994 | Jenkins et al. | |
| 5,387,475 | A | | 2/1995 | Baresel et al. | |
| 5,584,921 | A | * | 12/1996 | Wagner et al. | 106/287.1 |
| 5,637,143 | A | | 6/1997 | Jenkins et al. | |
| 5,780,412 | A | | 7/1998 | Scarborough et al. | |
| 5,998,525 | A | * | 12/1999 | Wang et al. | 524/425 |
| 6,087,438 | A | * | 7/2000 | Herber et al. | 524/588 |
| 6,190,780 | B1 | | 2/2001 | Shoji et al. | |
| 6,428,616 | B1 | | 8/2002 | Neely | |
| 6,589,661 | B2 | | 7/2003 | Neely | |
| 6,784,148 | B2 | * | 8/2004 | Tadrowski et al. | 510/197 |
| 6,866,709 | B1 | * | 3/2005 | Holbek | 106/38.3 |
| 6,969,539 | B2 | | 11/2005 | Gordon et al. | |
| 7,513,946 | B2 | | 4/2009 | Laumann et al. | |
| 2003/0022804 | A1 | | 1/2003 | Tadrowski et al. | |
| 2006/0166854 | A1 | | 7/2006 | Britton | |
| 2007/0000407 | A1 | | 1/2007 | Leong | |
| 2007/0017567 | A1 | * | 1/2007 | Gronet et al. | 136/246 |
| 2009/0102085 | A1 | * | 4/2009 | Stolte et al. | 264/71 |
| 2009/0165818 | A1 | * | 7/2009 | Smith et al. | 134/7 |
| 2009/0279879 | A1 | * | 11/2009 | Zenteno et al. | 392/416 |
| 2010/0212549 | A1 | * | 8/2010 | Holbek et al. | 106/661 |
| 2010/0326495 | A1 | * | 12/2010 | Gronet et al. | 136/246 |
| 2011/0000539 | A1 | * | 1/2011 | Gronet et al. | 136/256 |
| 2011/0021399 | A1 | * | 1/2011 | Smith et al. | 510/161 |

* cited by examiner

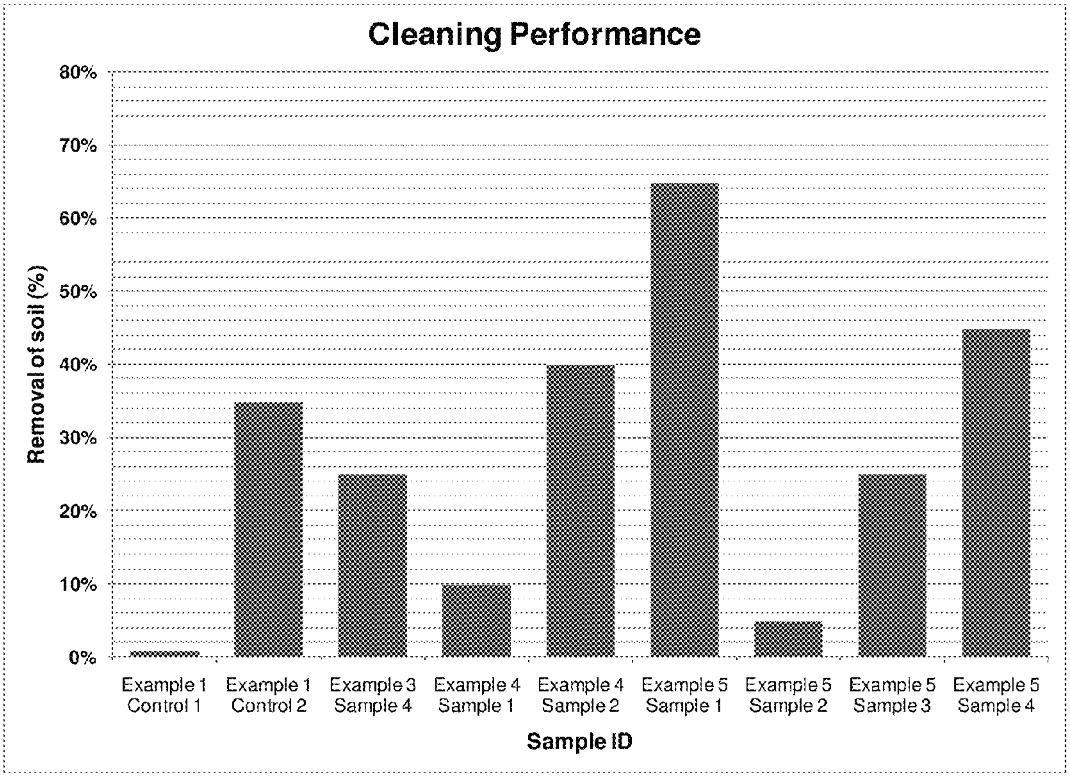
Cleaning Performance
80%
70%
60%
50%
40%
30%
20%
10%
0%
Removal of soil (%)
Example 1 Control 1
Example 1 Control 2
Example 3 Sample 4
Example 4 Sample 1
Example 4 Sample 2
Example 5 Sample 1
Example 5 Sample 2
Example 5 Sample 3
Example 5 Sample 4
Sample ID

COMPOSITION FOR EASY TO CLEAN SURFACES

FIELD OF THE INVENTION

The invention includes compositions that can be used in making easy to clean surfaces, such as coatings for home or commercial cooking appliances, fryers, smokers, BBQ grills, engine components, and oil refineries.

BACKGROUND OF THE INVENTION

The most difficult aspect of cleaning surfaces of cooking appliances, especially that of an oven, is to clean baked-on food from the surface of the appliances. However, if the appliance is not cleaned often, the amount of baked-on food can build up rapidly, thereby increasing the cleaning difficulty.

There are several known methods to facilitate the removal of baked-on food from the surfaces of the cooking appliances, such as the interior surfaces of ovens. One of the most widely used methods is pyrolysis or the application of highly alkaline chemical oven cleaners. However, these methods have several disadvantages.

The highly alkaline chemical oven cleaners have the disadvantage of containing significant amounts of caustics, such as sodium hydroxide and/or potassium hydroxide. These caustics, while effective in removing baked-on food, are hazardous to handle. Fumes from such products can irritate the eyes and throat and can also cause chemical skin burns. Further, the resulting product from the cleaners and the baked-on food is also hazardous to handle.

The pyrolysis method, on the other hand, resolves the problem of safety hazards associated with using the highly alkaline chemical cleaners. However, this method also has its own problems. The pyrolysis method is used in "self-cleaning" cycles for many ovens. During pyrolysis, baked-on foods are pyrolyzed (such as oxidized) to carbon ash residue that can be wiped from the interior surfaces of the oven once it cools. However, to be effective, such pyrolytic heating cycles must maintain the temperature inside of the oven above about 500° C. (900° F.) for a period of about 60 minutes. Such heating cycles are very expensive to operate because of the power consumed to generate and maintain the high temperature. The coating on the interior surface of the oven also tends to craze and even flake off when they are repeatedly exposed to such elevated temperatures.

BRIEF DESCRIPTION OF THE INVENTION

This invention provides for a composition that is suitable for use in making easy to clean surfaces, such as easy to clean coating for cooking appliances or self-cleaning ovens.

Broadly, the composition is a reaction product of a first compound, a second compound, and an optional polymer. In the present application, the term "reaction product" refers to both physical and/or chemical interactions between chemical compounds, such as complexing, chemical reaction, polymerization, co-polymerization, sol-gel condensation, interpenetrating networks, and the like.

Preferably, the first compound is a compound of a formula AYB, wherein A comprises an alkyl group, Y comprises a metalloid, and B comprises alkali metals. Preferably, B is connected to Y through oxygen linkage.

Preferably, the second compound comprises (i) a compound (1) selected from a group consisting of the compound of a formula MR, and a precursor of the compound of the formula MR, wherein M is selected from a group consisting of alkali metal, alkaline earth metal, transition metal, and a mixture thereof, and R is selected from a group consisting of phosphonic group, phosphinic group, phosphoric group, and a mixture thereof;

(ii) a compound (2) comprising metal oxides, metal hydroxides, or metal peroxides, wherein the metal is selected from alkaline earth metals; and/or (iii) a mixture thereof.

Preferably, the composition is resistant to decomposition at a temperature equal to or greater than 400° C. Further, the composition coats a surface and enables the surface to be easy to clean and/or self-clean at a temperature range of 50° C. to 600° C.

Preferably, the first compound is present in the range of about 5 wt % to about 90 wt %, and more preferably, it is present in the range of about 50 wt % to about 90 wt %. Within the composition, AYB is preferably acting as an organic/inorganic hybrid binder. A preferred embodiment of AYB is alkali metal methyl siliconate. Most preferably, the first compound of AYB is a methyl siliconate sodium salt (such as Aremco® 642).

Unlimited suitable examples of the compound of the formula MR include, but are not limited to, zirconium hydrogen phosphate, zirconium phosphate, zirconium pyrophosphate, hydroxy apatite, calcium phosphate, or a mixture thereof. Preferably, the precursor of the compound (1) comprises phosphotungstic acid, phosphomolybdic acid, other similar phospho-heteropoly acids, or a mixture thereof.

Preferably, the precursor of the compound of the formula MR comprises phosphotungstic acid, phosphomolybdic acid, other phospho-heteropoly acids, or a mixture thereof.

Preferably, the compound (2) is magnesium oxide (MgO), magnesium peroxide ($MgO_2$), magnesium hydroxide ($Mg(OH)_2$), or a mixture thereof.

Preferably, the optional polymer comprises poloxamer, epoxy resin, alkyd, polyester, polyurethane, polyolefin, polyamide, phenolic, urethane, rosin esters, silicones, siloxanes, perfluorinated resin, other fluorinated resin, Teflon®, polyvinylidene difluoride, nylon, copolymers thereof, or a mixture thereof.

According to some embodiments of the present invention, a method of making the above composition for coating cooking appliances, comprising a. producing a mixture comprising the first compound of the formula AYB, the second compound, and an optional polymer;
b. forming the mixture of step a into a preproduct; and
c. heating and curing the preproduct at a temperature wherein the coating is formed.

The first compound of the formula AYB, the second compound, and the optional polymer are described in detail above. Preferably, a "preproduct" includes a coating on a suitable substrate. Preferably, the substrate is the surface of a cooking appliance, more preferably the surface of a self-clean oven. The temperature of step c is in the range of about 25° F. to about 500° F.

BRIEF DESCRIPTION OF THE DRAWINGS

FIG. 1 illustrates the cleaning performance of samples from Examples 3, 4 and 5 in comparison to the controls of Example 1.

DETAILED DESCRIPTION OF THE INVENTION AND BEST MODE

Broadly, this invention provides for a composition that is suitable for use in making easy to clean surfaces, especially as an easy to clean coating adhering on the surface of cooking appliances, such as self-cleaning ovens. Further, the resulting composition is resistant to oxidative degradation at a temperature at about 400° C. or higher. More importantly, the composition can adhere to the surface of a cooking appliances to make the surface easy to clean and/or can self-clean at a temperature range of about 50° C. to 600° C., preferably at about 150° C. to 350° C. The resulting composition can be cured at a lower temperature in the range between about 25° F. and about 500° F.

Currently, the prior art coating in the self-cleaning ovens require high temperatures, about 400 to 500° C., for about a couple of hours to remove food stuck on the surface of the oven, especially the hard-to-remove proteins and the polymerized oils. The term "lower elevated temperature" or "reduced elevated temperature" refers to the temperature below the temperatures (400-500° C.) used for self-cleaning the surfaces of the oven using the prior art coating. The term "stuck contaminant" or "attached contaminant" refers to the contaminations, such as food particles, proteins, other contaminants, which stuck, baked-on or adhere to a surface, which make the cleaning of the surface very hard, and which can result in clogging of equipment over time. The term "easy to remove surface" or "easy to clean surface" refers to a surface with easy to remove contaminants: In the present application, after the application of the composition to the surface, the stuck-on contaminants are hydrolyzed at preferred temperatures, and can be easily removed or cleaned thereafter.

The composition of the present invention is capable of detaching attached contaminants, especially the hard-to-remove protein and polymerized oil, from the surface of the food appliance easily at a reduced or lower elevated temperature within a relatively short time. While not wishing to be bound by theory, it is presently believed that a slight increase in temperature is able to activate the catalytic function of the composition to efficiently catalyze or hydrolyze the contaminant molecules, particularly the protein molecules.

In the present application, the term "reaction product" refers to both physical and/or chemical interactions between chemical compounds, such as complexing, chemical reaction, polymerization, co-polymerization sol-gel condensation, interpenetrating network, and the like.

According to some broad embodiments of the present invention, the composition is a reaction product of a. a first compound of a formula AYB, wherein A comprises an alkyl group, Y comprises a metalloid, and B comprises alkali metal;

b. a second compound comprising (i) a compound (1) selected from a group consisting of a compound of a formula MR, and a precursor of the compound of the formula MR, wherein M is selected from a group consisting of alkali metal, alkaline earth metal, transition metal, and a mixture thereof, and R is selected from a group consisting of phosphonic group, phosphinic group, phosphoric group, and a mixture thereof;

(ii) a compound (2) comprising metal oxides, metal hydroxides, or metal peroxides, wherein the metal is selected from alkaline earth metals; and/or (iii) a mixture thereof; and c. an optional polymer.

Preferably, the first compound is present in the range of about 5 wt % to about 90 wt %, and more preferably in the range of about 50 wt % to about 90 wt %.

According to some embodiments of the present invention, the compound of the formula AYB (also referred to as "AYB") can be an organic, semi-inorganic, or inorganic binder. AYB can also be referred to as an alkali metal methyl metalloid salt. Metalloid typically refers to Boron (B), Silicon (Si), Germanium (Ge), Arsenic (As), Antimony (Sb), and Tellurium (Te). Preferably, the metalloid should provide heat stability and chemical attack resistance to AYB. Accordingly, a preferred metalloid for the present invention is silicon. Because the metalloid is the anion in the compound of the formula AYB, the preferred metalloid anion is siliconate or silicate. Silicate anion is known to provide water repellant quality, heat stability, and chemical attack resistance to its compound. Therefore, the preferred embodiment of the AYB is alkali metal methyl silicate or alkali metal methyl siliconate compound. More preferably, AYB is a methyl siliconate sodium salt, which has the structure below:

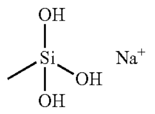

Methyl siliconate sodium salt is commercially sold under the trade name Aremco® 642 as a high temperature binder. While not wishing to be bound by theory, it is believed that the first compound described in the present invention undergoes sol-gel condensation or otherwise to form a reaction product with the second compound.

For the purpose of the present invention, the second compound can be the compound (1), the compound (2), or a mixture of the compound (1) and the compound (2).

The compound (1) can be either the compound of the formula MR (also called "MR"), or the precursor of MR. Preferably, the second compound is a catalyst with a capability to hydrolyze or catalyze contaminant particles at a slightly elevated temperature of 50° C. or higher.

Unlimited examples for the preferred compound of the formula MR are zirconium hydrogen phosphate, zirconium phosphate, zirconium pyrophosphate, hydroxyapatite (also called HAP), other apatite, or a mixture thereof. Preferably, the precursor of MR comprises phosphotungstic acid, phosphomolybdic acid, other phospho-heteropoly acids, or a mixture thereof. Phosphate, phosphonic, and phosphinic groups provide for the catalytic functions, typically through an acidic catalytic process. It is also desirable for the compound (1) to have thermal and chemical stability so that the resulting composition can be thermally and chemical stable at elevated temperature while providing the catalytic function for self-cleaning at slightly elevated temperature.

Zirconium hydrogen phosphates are acidic, inorganic cation exchange materials that have a layered structure with formula $Zr(HPO_4)_2.nH_2O$. Zirconium hydrogen phosphates have high thermal and chemical stability, solid state ion conductivity, resistance to ionizing radiation, and the capacity to incorporate different types of molecules with different sizes between their layers. There are various phases of zirconium phosphate which vary in their interlaminar spaces and their crystalline structure. Among all the Zirconium phosphate phases, the mostly widely used are the alpha ($Zr(HPO_4)_2.H_2O$) and the gamma ($Zr(PO_4)(H_2PO_4).2H_2O$) phase.

Hydroxyapatite (HAP) is a naturally occurring mineral form of calcium apatite with the formula $Ca_5(PO_4)_3(OH)$, but is usually written $Ca_{10}(PO_4)_6(OH)_2$ to denote that the crystal unit cell comprises two entities. Hydroxyapatite is the hydroxyl endmember of the complex apatite group. It crystallizes in the hexagonal crystal system.

The precursor of the MR is preferably a phospho-heteropoly acid, and more preferably is phosphotungstic acid and/or phosphomolybdic acid. This type of acid is used here as a re-usable acid catalyst. The preferred phospho-heteropoly acids have either Keggin structure of $XM_{12}O_{40}^{n-}$ or Dawson structure of $X_2M_{18}O_{62}^{n-}$. They typically have good thermal stability, high acidity and high oxidizing ability.

The compound (2) preferably comprises magnesium oxide (MgO), magnesium peroxide ($MgO_2$), magnesium hydroxide ($Mg(OH)_2$), or a mixture thereof. Magnesium hydroxide, magnesium peroxide, and magnesium oxide are oxidation catalysts, which catalyze at a lower temperature of about 200° C. or above. More preferred embodiments of the compound (2) are magnesium hydroxide and magnesium oxide, because they are safe to handle and can be regenerated after their catalytic reaction. A lesser preferred choice for the compound (2) is magnesium peroxide because it is relatively unsafe to handle and cannot be regenerated after being used in the cleaning operation.

As explained above, the second compounds are catalysts, and are often used to clean stuck contaminants, such as food items, from surfaces through their catalytic function. Specifically, the second compound catalyzes the stuck contaminants, and as the result, the catalyzed contaminants can be easily removed. However, it is difficult or almost impossible to incorporate such catalysts into a network of composition that polymerizes and/or adheres to a surface while still retaining the catalytic function so that the resulting surface can be easy to clean and/or self-clean at a lower elevated temperature while resistant to degradation at very high temperatures of about 400° C. or higher. In other words, at such elevated temperatures, the composition must be both stable and reactive: stable against chemical degradation, while reactive to catalyze the degradation of contaminant particles, proteins, or polymerized oils. Moreover, it is more difficult to incorporate such catalysts at a very lower loading percentage, such as 5 to 25 wt %, into another network while still retaining their catalytic functions.

In some embodiments, the second compound includes mild catalysts, such as zirconium hydrogen phosphates. Such catalysts have a high thermal and chemical stability. As such, it is often very difficult or impossible to incorporate such stable catalysts into another chemical network, through complexing or interpenetrating, without reducing or losing the catalytic function of the catalysts. It is even more difficult to incorporate such catalyst into a network that must be able to polymerize and adhere to the surface strongly. That is, the present invention requires a composition that must be able to adhere to the surface so strongly that the composition would not detach from the surface even at a high temperature as high as 600° C. Such a composition, then, is likely to override, interfere, reduce, or even destroy the catalytic function of its catalytic component (the second compound), rendering the composition inert with regard to catalyzing the contaminant particles. In some cases, the catalytic component, such as the second compound, is being so tightly incorporated into the network of the first compound, it is unable to reach the contaminant molecules to perform its catalytic function.

In some embodiments, the second compound can include strong catalysts, such as magnesium oxide or magnesium peroxide. However, these catalysts are such strong oxidants that they oxidize, catalyze, or otherwise react with organic compounds or polymers. As such, after mixing these catalysts with other organic or inorganic compounds, the other compounds are oxidized or degraded so that no coating polymer or film can be produced. Moreover, after reacting with the other compounds, the catalytic function of the catalysts is likely to be reduced or eliminated. So even if a composition can be obtained to coat or to adhere to the surface, such a surface might not have any catalytic power to enable it to be self-cleaning or easy to clean at lower elevated temperatures.

In the present invention, while not wishing to be bound by theory, it is currently believed that the first compound does not react with the second compound chemically, instead the first compound complexes with the second compound in macro and/or molecular levels. During the complexing process, the first compound, such as Aremco 642, incorporates the second compound into its matrix without reducing, or maybe even increasing, the catalytic capability of the second compound even at a low loading level of about 5 wt % to 25 wt %. The second compound retains most or all of its catalytic function without oxidizing and thus destroying the matrix of the first compound. Therefore, the present invention provides a composition with a dual quality of being thermally stable against degradation and being thermally reactive against the contaminant/protein molecules.

Preferably, the second compound includes both the compound (1) and the compound (2), which are preferably zirconium hydrogen phosphate and magnesium oxide. When the second compound is such a combination of compounds, the resulting composition can adhere to a surface so as impart the surface with a much better cleaning capability at a lower elevated temperature of about 300° C. (see the examples below).

The optional polymer is added to provide more processable properties to the resulting composition so that the composition can coat or adhere to the surface to enable the surface to be easy to clean. Typically, a polymer imparts adhesion, binds the coating composition together, and strongly influences such properties as gloss potential, exterior durability, flexibility, and toughness. Polymers can be categorized according to drying, or curing mechanism. The four most common are simple solvent evaporation, oxidative crosslinking, catalyzed/cross linked polymerization, coalescence, among others. Unexpectedly, even with the additional of one or more optional polymers, the composition of the present invention is able to retain its catalytic and/or cleaning power without degrading the optional polymer.

The optional polymer can include, but is not limited to, poloxamer, epoxy resin, alkyd, polyester, polyurethane, polyolefin, polyamide, phenolic, urethane, rosin esters, silicones, siloxanes, perfluorinated resin, other fluorinated resin, Teflon®, polyvinylidene difluoride, nylon, copolymers thereof, or a mixture thereof.

In the reaction product of a preferred embodiment of the composition, optional diluents can be added, such as one or more solvents, and/or co-solvents. The aqueous solvent can be water. The co-solvents can include, but are not limited to, ketones, alcohols, esters, ethers, dimethyl acetamide, NMP, sulfolane, and other polar aprotic co-solvents.

The main purposes of the solvent are to act as carriers for the non-volatile components of the composition for coating a surface so as to adjust the curing properties and viscosity of the paint. It also controls flow and application properties, and affects the stability of the composition while in liquid state. Typically, the solvent does not become part of the film of the composition. That is, it imparts its properties temporarily—once the solvent has evaporated or disintegrated, the remaining composition is fixed to the surface.

Water is the main diluent for water-borne composition, even the co-solvent types. Solvent-borne, also called oil-based, composition can have various combinations of solvents as the diluent, including aliphatics, aromatics, alcohols, ketones and white spirits. These include organic solvents such as petroleum distillate, esters, glycol ethers, and the like. Sometimes volatile low-molecular weight synthetic resins also serve as diluents. Such solvents are used when water resistance, grease resistance, or similar properties are desired.

The resulting composition of the present invention is resistant to decomposition at temperatures equal to or greater than 400° C. In addition, the composition can make a coating covering the surface of an oven that is capable of self-cleaning at a temperature range of 50° C. to 600° C., preferably at the range of 150° C. to 300° C., and most preferably at 250° C. In particular, the composition of the present invention is capable of detaching the attached contaminant, especially hard-to-remove protein molecules, from the surface of the appliance easily at a lower elevated temperature within a relatively short time. That is, a slight increase in temperature within a short period of time is able to activate the catalytic function of the composition of the present invention while not affecting the stability of the composition. Currently, the prior art coating in the self-cleaning ovens require high temperatures, about 400 to 500° C., for about a couple of hours to remove food stuck on the surface of the oven, especially the hard-to-remove protein molecules.

In addition, the present invention provides a method of making a coating composition for coating cooking appliances, comprising (a) producing a mixture comprising the first compound, the second compound, and an optional polymer;

(b) forming the mixture of step a into a preproduct; and (c) curing the preproduct at a temperature wherein the coating is formed.

The first compound, second compound, optional third compound, and optional polymer are described in detail above. In step (b), "forming the mixture of step a into a preproduct" can also be described as coating the mixtures of the metal alkoxides and the diketonate compounds on suitable substrates. Curing the preproduct refers to the process of reacting the preproduct at a temperature wherein the nanocomposite is produced. In other words, step (c) is another way of describing the process of curing the preproduct using one or combinations of the following techniques: (1) thermal; (b) radical or ionic; (c) photochemical; and (d) microwave irradiation, with the thermal process being the preferred one. Preferably, the temperature of step c is in the range of about 25° C. to 500° C.

The composition can be applied onto surfaces of cooking appliances by various methods. The methods include, but are not limited to, spray, thermal spray, plasma spray, flame spray, dip, brush, powder coat, spin coat, physical vapor deposition, electroplating, electroless plating, and other conventional coating methods.

In addition, the composition of the present invention can be applied onto surfaces of the injectors for diesel engines, lubricant lines, engine components, reactors for biodiesel production, oil refineries, or other similar equipment. During operation, these surfaces are gradually heated to high temperatures, at which time, the composition of the present invention is activated to hydrolyze/catalyze the surface contaminants to facilitate easy removal of degraded surface contaminants. This self-cleaning action keeps the surface relatively clean, preventing clogging and extending the life of the equipment.

EXAMPLES

The present invention is further illustrated by the following examples which are illustrative of some embodiments of the invention and are not intended to limit the scope of the invention in any way. Further, all percentages ("%") in the examples are percentages in weight or "wt %":

Example 1

This example examined the control coating compositions, which did not include the composition of the present invention.

TABLE 1

Formulations of Control Samples for Example 1

| | Sample ID | Ingredients | Pencil Hardness |
|---|---|---|---|
| Control 1 | | Commercially available porcelain enamel applied on a low carbon steel substrate | 9 H+ |
| Control 2 | 51902-13-27 | 1 mil drawdown of Silikophen P40-W | 2 H |
| Control 3 | 51902-25-12 | 0.5 mil drawdown of Aremco 642 | 9 H+ |
| Control 4 | 51902-15-05 | 2 mil drawdown of 4.04 g/4.04 g Silikophen P40-W/Aremco 642 | 9 H+ |
| Control 5 | 51902-35-07 | 0.5 mil drawdown of Teflon Emulsion (Aldrich 665800) | Not measurable |

Silikophen P40-W is a methylphenyl polysiloxane resin, and it is typically used for anti-corrosion coatings and heat-resistant decorative coatings. Aremco® 642 is a trade name for methyl siliconate sodium salt. FluoroTEOS is a (tridecafluoro-1,1,2,2-tetrahydrooctyl) triethoxysilane W-210 Microspheres (obtained from 3M) are fine particle size high-strength ceramic microspheres.

Result and Conclusion:

The control sample coatings showed degradations at 300° C. to 500° C., which is demonstrated by the complete removal of the coating layer after exposure at a temperature in the range of 300° C. to 500° C. The degradation of the coating was expected because fluorinated and silicone resins typically degrade above 350° C.

In addition, the controls 2 and 4 showed that the addition of methyl siliconate sodium salt to Silikophen (methylphenyl polysiloxane resin) increased the hardness of the resulting coating drastically comparing to that of the Silikophen alone. It suggests that methyl siliconate sodium salt is compatible with heat-resistant coatings, and further, it can be used to provide more processable coating properties to the heat resistant coatings.

Example 2

This example examined the coating composition of Aremco 642, $ZrH(PO_4)_2$, and Pluronic L-64, which is manufactured by BASF. In this example, $ZrH(PO_4)_2$ was synthesized in the lab. Aremco 642 is a trade name for methyl siliconate sodium salt. Pluronic L-64 from BASF is a non-ionic surfactant, composed of poly(ethyleneoxide)-poly(propylene oxide) copolymer.

Procedure of Making the Composition:

A. Preparation of 1% Surfactant Stock solution: Dispersed 0.04 g Pluronic L-64 from BASF in 40 g of distilled water, and mixed until dissolved.

B. Synthesis of $ZrH(PO_4)_2$: In a 250-ml beaker, dissolved 5 g of zirconyl chloride-$8H_2O$ in 50 g water. Added 55 ml of 10 wt % o-phosphoric acid and mixed mechanically overnight. A white precipitate was formed after the overnight mixing. Filtered the resulting white precipitates with Whatman 1 filter paper, and dried the retained solid on the filter paper in an vacuum oven at 90-150° C. overnight (for about 20 hours).

C. Preparing the Coating Composition: Mixed the ZrH$(PO_4)_2$ product from step B with Aremco 642 and Surfactant Stock solution according to the amounts stated in Table 2. Ball-milled the mixture overnight. Coated the surface of a decarburized stainless steel plate with the ball-milled mixture by using a drawndown bar to a 0.5 mil thickness.

D. Curing the Coating Composition: (1) cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 2

Formulations of Samples for Example 2

| Sample | Lab ID | Ingredients | Contact Angle Olive Oil* |
|---|---|---|---|
| 1 | 51902-47-5 | 15 g Aremco 642, 0.75 g (5%) $ZrH(PO_4)_2$, 0.75 g Pluronic surfactant stock solution | 21 |
| 2 | 51902-47-15 | 15 g Aremco 642, 2.25 g (15%) $ZrH(PO_4)_2$, 2.25 g Pluronic surfactant stock solution | n/a |
| 3 | 51902-47-25 | 15 g Aremco 642, 3.75 g (25%) $ZrH(PO_4)_2$, 3.75 g Pluronic surfactant stock solution | 17 |

Results and Discussion:

The resulting coatings showed very good coating qualities. The coating was shown to be water resistant as demonstrated by a water resistant test: the coating was dipped into water for about 24 hours, and no leaching of the coating was observed in water. Furthermore, the coating is believed to be resistant to decomposition at temperatures above 500° C.

Example 3

This example examined the coating composition of Aremco 642, $ZrH(PO_4)_2$, and Pluronic L-64 from BASF. In this example, $ZrH(PO_4)_2$ was obtained from Pfaltz and Bauer. Aremco 642 is a trade name for methyl siliconate sodium salt. Pluronic L-64 from BASF is a non-ionic surfactant, composed of a difunctional block copolymer surfactant terminating in primary hydroxyl groups Procedure of Making the Coating Composition:

A. Preparation of 1% Surfactant Stock solution: Dispersed 0.04 g Pluronic L-64 into 40 g of distilled water, and mixed until dissolved.

B. Preparing the Coating Composition: Mixed the commercially obtained $ZrH(PO_4)_2$ with Aremco 642 and Surfactant Stock solution according to the amounts stated in Table 3. Ball-milled the mixture overnight (for about 20 hours). Coated the surface of a decarburized stainless steel plate with the ball-milled mixture by using a drawndown bar to a 0.5 mil thickness.

C. Curing the Coating Composition: (1) first cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 3

Formulations of Samples for Example 3

| Sample | Lab ID | Ingredients | Olive Oil Contact Angle |
|---|---|---|---|
| 1 | 51902-45-13 | 15 g Aremco 642, 0.75 g (5%) $ZrH(PO_4)_2$, 0.75 g Pluronic surfactant stock solution | 21 |
| 2 | 51902-45-22 | 15 g Aremco 642, 2.25 g (15%) $ZrH(PO_4)_2$, 2.25 g Pluronic surfactant stock solution | 19 |
| 3 | 51902-45-30 | 15 g Aremco 642, 3.75 g (25%) $ZrH(PO_4)_2$, 3.75 g Pluronic surfactant stock solution | 16.5 |
| 4 | 51902-70-30 | 10 g Aremco 642, 3 g (30%) $ZrH(PO_4)_2$, 3 g Distilled Water | |

Discussion:

The resulting coatings showed very good coating qualities. The coating composition was shown to be water resistant by the results of the water resistant test: the coating was dipped into water for about 24 hours, and no leaching of the coating was observed in water. Furthermore, the coating is believed to be resistant to decomposition at temperatures above 500° C.

Finally, no difference was observed between the physical appearances of the coatings of Example 2 and that of Example 3.

Example 4

This example examined the coating composition of Aremco 642, Magnesium Hydroxide and Peroxide, with ZrH$(PO_4)_2$ and Pluronic L-64. In this example, Magnesium hydroxide and peroxide were purchased from Aldrich. ZrH$(PO_4)_2$ was obtained from Pfaltz and Bauer. Aremco 642 is a trade name for methyl siliconate sodium salt. Pluronic L-64 is a non-ionic surfactant, composed of a difunctional block copolymer surfactant terminating in primary hydroxyl groups.

Procedure of Making the Coating Composition:

A. Mixed 10 g Aremco 642, 1.5 g $Mg(OH)_2$, 1.5 g $Zr(HPO_4)_2$, and 3 g distilled water with a Flackteck high speed mixer for 2 minutes at 3000 RPM.

B. Ball-milled the mixture for at least 6 hours, and then immediately applied to a stainless steel panel.

C. Cured the coating by this schedule: (1) first cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 4

Formulations of Samples for Example 4

| Sample | Lab ID | Ingredients | Olive Oil Contact Angle |
|---|---|---|---|
| 1 | 51902-68-24 | 10 g Aremco + 1.5 g $ZrH(PO_4)_2$ + 1.5 g $Mg(OH)_2$ + 3 g DI water | n/a |

TABLE 4-continued

| Formulations of Samples for Example 4 | | | |
|---|---|---|---|
| Sample | Lab ID | Ingredients | Olive Oil Contact Angle |
| 2 | 51902-65-14 | 10 g Aremco + 1.5 g $ZrH(PO_4)_2$ + 1.5 g Magnesium Peroxide + 3 g DI water | 4 |

Discussion:

The resulting coatings showed good coating qualities. As such, magnesium peroxide and $Mg(OH)_2$ were shown to be compatible with other ingredients in the formulation.

Example 5

This example examined the coating composition that was composed of Aremco 642, magnesium oxide/magnesium hydroxide, and boron nitride. In this example, magnesium oxide and magnesium hydroxide were purchased from Aldrich. Boron nitride (BN) was purchased from Advanced Ceramics Corporation. $ZrH(PO_4)_2$ was obtained from Pfaltz and Bauer. Aremco 642 is a trade name for methyl siliconate sodium salt. Pluronic L-64 is a non-ionic surfactant, which is composed of a difunctional block copolymer surfactant terminating in primary hydroxyl groups.

Procedure of Making the Coating Composition:

A. Mixed the ingredients listed in Table 5 for 2 minutes at 3000 RPM.
B. Ball-milled the mixture for at least 6 hours, and then immediately apply to a stainless steel panel.
C. Cured the coating by this curing schedule: (1) first cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 5

| Formulations of Samples for Example 5 | | |
|---|---|---|
| Sample | Lab ID | Ingredients |
| 1 | 51902-69-1 | 10 g Aremco + 3 g $Mg(OH)_2$ + 3 g DI water |
| 2 | 51902-68-14 | 10 g Aremco + 4 g BN + 4 g DI water |
| 3 | 51902-69-11 | 10 g Aremco + 1 g $Mg(OH)_2$ + 1 g BN + 3 g DI water |
| 4 | 51902-69-21 | 10 g Aremco + 2 g MgO + 1 g BN + 3 g DI water |

Example 6

This example examined the coating composition comprising Aremco 642, HAP(A) and Pluronic L-64. In this example, HAP(A) is hydroxy apatite synthesized in the lab, which was used as an alternative to zirconium hydrogen phosphate. Aremco 642 is a trade name for methyl siliconate sodium salt. Pluronic L-64 is a non-ionic surfactant, composed of a difunctional block copolymer surfactant terminating in primary hydroxyl groups.

Procedure for Making the Coating Composition:

A. Preparation of 1% Surfactant Stock solution: Dispersed 0.04 g Pluronic L-64 into 40 g of distilled water, and mixed until dissolved.
B. Synthesis of HAP(A): In a 250-ml beaker, dissolved 120 g calcium nitrate in 50 g water. Dissolved 34.5 g ammonium dihydrogen phosphate in 50 ml water. Added the ammonium dihydrogen phosphate solution drop-wise to the calcium nitrate solution. Stirred the mixture overnight (about 15 hours). A white precipitate was formed during the overnight stirring. The white precipitate was filtered and washed several times with distilled water until the washing solution was neutral. Collected the washed precipitate, and dried the collected precipitates in the Fisher Isotemp oven for about 16 hours at about 90-150° C.
C. Preparation of the Coating Composition: Mixed the HAP(A) product from step B with Aremco 642 and Surfactant Stock solution according to the amounts stated in Table 6. Ball-milled the mixture overnight (about 20 hours). Coated the surface of a decarburized stainless steel plate with the ball-milled mixture by using a drawndown bar to a 0.5 mil thickness.
D. Curing of the coating: (1) first cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 6

| Formulations of Samples for Example 6 | | |
|---|---|---|
| Sample | Lab ID | Ingredients |
| 1 | 51902-49-30 | 10 g Aremco 642, 0.5 g (5 wt %) HAP(A), 0.5 g Pluronic surfactant stock solution |
| 2 | 51902-50-3 | 10 g Aremco 642, 1.5 g (15%) HAP(A), 1.5 g Pluronic surfactant stock solution |
| 3 | 51902-50-11 | 10 g Aremco 642, 2.5 g (25%) HAP(A), 2.5 g Pluronic surfactant stock solution |

Discussion:

The resulting coatings showed very good coating qualities. Therefore, HAP(A) was shown to be compatible with other ingredients in the formulations.

Example 7

This example examined the coating composition comprising Aremco 642, HAP(B) and Pluronic L-64. In this example, HAP(B), hydroxy apatite, was purchased commercially from Aldrich in a form of nano-powder, which had particle sizes of less 200 nm. Aremco 642 is a trade name for methyl siliconate sodium salt. Pluronic L-64 is a non-ionic surfactant, composed of a difunctional block copolymer surfactant terminating in primary hydroxyl groups.

Procedure for Making the Coating Composition:

A. Preparation of 1% Surfactant Stock solution: Dispersed 0.04 g Pluronic L-64 into 40 g of distilled water, and mixed until dissolved.
B. Preparation of the Coating Composition: Mixed the commercially purchased HAP(B) with Aremco 642 and Surfactant Stock solution according to the amounts stated in Table 7. Ball-milled the mixture overnight (about 20 hours). Coated the surface of a decarburized stainless steel plate with the ball-milled mixture by using a drawndown bar to a 0.5 mil thickness.
C. Curing the coating by this schedule: (1) first cured the coating at room temperature in the air for about 1 hour;

(2) continued to cure the air dried coating at 200° F. in a Vulcan bench top muffle oven for about 3 hours; (3) continued to cure the coating at 400° F. in the same oven for about 1 hour; and (4) continued to cure the coating at 500° F. in the same oven for about 1 hour.

TABLE 7

Formulations of Samples for Example 7

| Sample | Lab ID | Ingredients |
|---|---|---|
| 1 | 51902-50-28 | 15 g Aremco 642, 0.75 g (5 wt %) HAP(B), 0.75 g Pluronic surfactant stock solution |
| 2 | 51902-51-04 | 15 g Aremco 642, 2.25 g (15 wt %) HAP(A), 2.25 g Pluronic surfactant stock solution |
| 3 | 51902-51-12 | 15 g Aremco 642, 3.75 g (25 wt %) HAP(A), 3.75 g Pluronic surfactant stock solution |

Discussion:

The resulting coatings showed very good coating qualities. Therefore, HAP(B) was shown to be compatible with other ingredients in the formulation.

Example 8

This example examined the coating composition comprising Aremco 642, PTA and Pluronic L-64. In this example, PTA, phosphotungstic acid, was commercially purchased from Alfa Aesar #40116. Aremco 642 is a trade name for methyl siliconate sodium salt. Pluronic L-64 is a non-ionic surfactant, composed of a difunctional block copolymer surfactant terminating in primary hydroxyl groups.

Procedure for Making the Coating Composition:

A. The amounts of PTA, water, Triethyl Amine (TEA), and Aremco used are listed in Table 6. Dissolved a suitable amount of PTA in water. Added an appropriate amount of TEA to the PTA solution to make the mixture basic (at about pH of 7.5). Fine white precipitates were formed immediately upon changing the pH of the PTA solution. Mixed the resulting PTA/TEA mixture with Aremco 642 with a high speed Flackteck mixer at 300 RPM for about 5 to 20 minutes. Upon mixing, the white precipitates disappeared, resulting in a very viscous liquid that was used to coat a decarburized stainless steel plate surface in step B.

B. Coated the surface of the steel plate with the viscous liquid mixture by using a drawndown bar to a 0.5 mil thickness.

C. Cured the coating by this curing schedule: (1) first cured the coating at room temperature in the air for about 1 hour; (2) continued to cure the air dried coating at 200° F. in a Vulcan bench top muffle oven for about 2 hours; (3) continued to cure the coating at 400° F. in the same oven for about 1 hour; and (4) continued to cure the coating at 500° F. in the same oven for about 1 hour.

TABLE 8

Formulations of Samples for Example 8

| Sample | Lab ID | Ingredients | Olive Oil Contact Angle |
|---|---|---|---|
| 1 | 51902-46-07 | 3 g Aremco 642, 0.15 g (5 wt %) PTA, 2 g water, 0.02 g TEA | 19 |
| 2 | 51902-46-19 | 3 g Aremco 642, 0.45 g (15 wt %) PTA, 2 g water, 0.09 g TEA | 27 |
| 3 | 51902-46-19 | 3 g Aremco 642, 0.75 g (25 wt %) PTA, 2 g water, 0.16 g TEA | n/a |

Discussion:

The resulting coatings showed very good coating qualities, demonstrating that PTA was compatible with Aremco and other ingredients in the formulations. The contact angle showed that the coating was water resistant.

Cleaning Performance of Coatings for Examples 3-5

The coatings illustrated in the above Examples 3-5 were subjected to a cleaning capability test, and their performance was compared with the controlled coatings and commercially available porcelain enamel coatings in Example 1. The decarburized stainless steel panels were used and were referred to as test coupons. These test coupons were coated with the coating compositions of Examples 3-5.

Extra virgin olive oil was applied onto the coated test coupons using drawdown bar (2 mil thickness). Each of the coupons was exposed to 300° C. for about 1 hour until a layer of dark polymerized oil was observed on the surface of the test coupon. The soiled surface was cleaned with a felt fabric wetted with 1 milliliter of distilled water. A pressure of 2.4 kilogram was applied during back and forth cleaning operation for twenty times over an area of eight square centimeters. The number of strokes needed to remove the soiled surface was recorded.

A quantitative cleaning score was assigned based on the number of rubs, which was illustrated in FIG. 1. In FIG. 1, the cleaning performances of various samples from Examples 3-5 are compared to that of the controls from Example 1. It is evident that the magnesium and zirconium phosphate containing coatings performed better at cleaning the soiled surface in comparison to that of the leading brands of commercially available porcelain enamel coatings.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

The invention claimed is:

1. A coating composition suitable for use in covering a surface that enables the surface to have an improved cleaning performance at 150° C. or above, comprising a reaction product of a. a first compound of a formula AYB, wherein A comprises an alkyl group, Y comprises a metalloid, and B comprises alkali metal, wherein B is connected to Y through oxygen linkage;

b. a compound (1) selected from a group consisting of zirconium hydrogen phosphate, zirconium phosphate, zirconium pyrophosphate, hydroxy apatite, calcium phosphate, phosphotungstic acid, phosphomolybdic acid, and a mixture thereof; and c. an optional polymer wherein the reaction product is cured at a temperature at 150° C. or above, which enables the coated surface to have an improved cleaning performance at 150° C. or above.

2. The composition according to claim 1, wherein prior to reaction, the first compound is present in the range of about 10 wt % to about 90 wt %.

3. The composition according to claim 1, wherein prior to reaction, the first compound is present in the range of about 50 wt % to about 90 wt %.

4. The composition according to claim 1, wherein the first compound of the formula AYB is an organic/inorganic hybrid binder.

5. The composition according to claim 1, wherein the first compound of the formula AYB is a methyl siliconate sodium salt.

6. The composition according to claim 1, further comprising non-ionic surfactant.

7. The composition according to claim 1, further comprising a compound (2) comprising metal oxide, metal hydroxides, or metal peroxide, wherein the metal is selected from alkaline earth metals.

8. The composition according to claim 7, wherein the compound (2) is magnesium oxide, magnesium peroxide, magnesium hydroxide, or a mixture thereof.

9. The composition according to claim 1, wherein the optional polymer comprises poloxamer, epoxy resin, alkyd, polyester, polyurethane, polyolefin, polyamide, phenolic, urethane, rosin esters, silicones, siloxanes, perfluorinated resin, other fluorinated resin, Teflon®, polyvinylidene difluoride, nylon, copolymers thereof, or a mixture thereof.

10. The composition according to claim 1, wherein the composition is resistant to decomposition at temperature equal to or greater than 400° C.

11. The composition according to claim 1, wherein the composition coats a surface of an electric oven so as to enable the surface to self-clean at a temperature range of 150° C. to 600° C.

12. A method of making a coating composition suitable for use in covering a surface that enables the surface to have an improved cleaning performance at 150° C. or above, comprising a. producing a mixture comprising
   i. a first compound of a formula AYB, wherein A comprises an alkyl group, Y comprises a metalloid, and B comprises alkali metal; and
   ii. a compound (1) selected from a group consisting of zirconium hydrogen phosphate, zirconium phosphate, zirconium pyrophosphate, hydroxy apatite, calcium phosphate, phosphotungstic acid, phosphomolybdic acid, and a mixture thereof; and
b. forming the mixture of step a into a preproduct; and
c. curing the preproduct at a temperature at 150° C. or above wherein the coating is formed, which enables the coated surface to have an improved cleaning performance at 150° C. or above.

13. The method according to claim 12, wherein the mixture of step a further comprises non-ionic surfactant.

14. The method according to claim 12, wherein the first compound of the formula AYB is an organic/inorganic hybrid binder.

15. The method according to claim 12, wherein the first compound of the formula AYB is a methyl siliconate sodium salt.

16. The method according to claim 12, further comprising a compound (2) comprising metal oxide, metal hydroxides, or metal peroxide, wherein the metal is selected from alkaline earth metals.

17. The method according to claim 16, wherein the compound (2) is magnesium oxide, magnesium peroxide, magnesium hydroxide, or a mixture thereof.

18. A coating composition suitable for use in covering a surface that enables the surface to have an improved cleaning performance at 150° C. or above, comprising a reaction product of
   a. a first compound of a formula AYB, wherein A comprises an alkyl group, Y comprises a metalloid, and B comprises alkali metal, wherein B is connected to Y through oxygen linkage;
   b. a compound (1) selected from a group consisting of zirconium hydrogen phosphate, zirconium phosphate, zirconium pyrophosphate, hydroxy apatite, phosphotungstic acid, phosphomolybdic acid, and a mixture thereof;
   c. a compound (2) comprising metal oxides, metal hydroxides, or metal peroxides, wherein the metal is selected from alkaline earth metals; and
   d. an optional polymer;

wherein the reaction product is cured at a temperature at 150° C. or above, which enables the coated surface to have an improved cleaning performance at 150° C. or above.

19. The composition according to claim 18, wherein the composition is resistant to decomposition at temperature equal to or greater than 400° C.

20. The composition according to claim 18, wherein the composition coats a surface of an electric oven so as to enable the surface to self-clean at a temperature range of 150° C. to 600° C.

21. The composition according to claim 18, wherein the first compound of the formula AYB is a methyl siliconate sodium salt.

22. The composition according to claim 18, wherein the compound (2) is magnesium oxide, magnesium peroxide, magnesium hydroxide, or a mixture thereof.

23. The composition according to claim 18, further comprising non-ionic surfactant.

* * * * *